(12) United States Patent
Kodama

(10) Patent No.: US 12,510,066 B2
(45) Date of Patent: Dec. 30, 2025

(54) PIEZOELECTRIC PUMP DEVICE HAVING MOVABLE FILTER ARRANGEMENT

(71) Applicant: Murata Manufacturing Co., Ltd., Kyoto (JP)

(72) Inventor: Yukiharu Kodama, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 85 days.

(21) Appl. No.: 18/494,105

(22) Filed: Oct. 25, 2023

(65) Prior Publication Data
US 2024/0052822 A1    Feb. 15, 2024

Related U.S. Application Data

(63) Continuation of application No. PCT/JP2022/017809, filed on Apr. 14, 2022.

(30) Foreign Application Priority Data

Apr. 27, 2021    (JP) .................................. 2021-074745

(51) Int. Cl.
*F04B 43/04*    (2006.01)
*B01D 46/10*    (2006.01)
*F04B 53/20*    (2006.01)

(52) U.S. Cl.
CPC ............ *F04B 43/046* (2013.01); *B01D 46/10* (2013.01); *F04B 53/20* (2013.01); *B01D 2265/04* (2013.01)

(58) Field of Classification Search
CPC ...... F04B 39/16; F04B 43/04; B01D 46/0005; B01D 46/10
See application file for complete search history.

(56) References Cited

U.S. PATENT DOCUMENTS 4,420,396 A * 12/1983 Yamamoto ......... B01D 35/0273
210/232
4,747,388 A * 5/1988 Tuckey ................ F02M 37/106
137/574

(Continued)

FOREIGN PATENT DOCUMENTS

JP        S57-81500 U       5/1982
JP        2009-103111 A     5/2009

(Continued)

OTHER PUBLICATIONS

DIY Chatroom; see https://www.diychatroom.com/threads/vintage-furnace-filter-options.714492/ (Year: 2021).*

(Continued)

*Primary Examiner* — Nathan C Zollinger
(74) *Attorney, Agent, or Firm* — McDonald Hopkins LLC

(57) ABSTRACT

A pump body includes a cover member having a through hole. A filter member is located and shaped, on an outside of the pump body closer to the cover member, so as to overlap the through hole. A plurality of adhesive members hold the filter member to the pump body so as to be able to change a distance between the cover member and at least a part, overlapping the through hole, of the filter member. The plurality of adhesive members are shaped such that a space formed between the cover member and the part, overlapping the through hole, of the filter member communicates with an opening between the cover member and at least a part of an outer edge of the filter member in a state in which the part, overlapping the through hole, of the filter member is apart from the cover member.

12 Claims, 11 Drawing Sheets

(56) References Cited

U.S. PATENT DOCUMENTS

| | | | | |
|---|---|---|---|---|
| 4,928,657 | A | * | 5/1990 | Asselin .................. G01F 23/18 |
| | | | | 123/514 |
| 4,989,572 | A | * | 2/1991 | Giacomazzi ....... F02M 37/0052 |
| | | | | 123/514 |
| 5,716,522 | A | * | 2/1998 | Chilton .................. B01D 35/26 |
| | | | | 428/292.1 |
| 2007/0007187 | A1 | * | 1/2007 | Bahl ...................... F02M 37/44 |
| | | | | 210/172.3 |

FOREIGN PATENT DOCUMENTS

| | | |
|---|---|---|
| JP | 2013-502537 A | 1/2013 |
| WO | 2019/131706 A1 | 7/2019 |

OTHER PUBLICATIONS

International Search Report for PCT/JP2022/017809 dated Jul. 5, 2022.

* cited by examiner

PIEZOELECTRIC PUMP DEVICE HAVING MOVABLE FILTER ARRANGEMENT

CROSS REFERENCE TO RELATED APPLICATION

This is a continuation of International Application No. PCT/JP2022/017809 filed on Apr. 14, 2022 which claims priority from Japanese Patent Application No. 2021-074745 filed on Apr. 27, 2021. The contents of these applications are incorporated herein by reference in their entireties.

BACKGROUND OF THE DISCLOSURE

Field of the Disclosure

The present disclosure relates to a pump device including a pump body configured to convey a gas, and a filter configured to filter the gas.

Description of the Related Art

Patent Document 1 describes a cooling device including a pump body having a piezoelectric pump built therein. The pump body has a passage for allowing a gas to enter. The passage communicates with an entrance hole through which a gas enters from the outside. In addition, part of the passage communicates with a discharge port through which a gas is discharged to the outside. The piezoelectric pump allows a gas to enter from the outside via the entrance hole and the passage and discharges the gas through the discharge port.

A filter is provided so as to cover the entrance hole. The filter regulates, when a gas enters the entrance hole, the passage of a liquid therethrough.

Patent Document 1: Japanese Unexamined Patent Application Publication No. 2009-103111

BRIEF SUMMARY OF THE DISCLOSURE

However, in some cases, it is required to convey a gas bidirectionally between the entrance hole and the discharge port. For example, when a cuff is installed on the discharge port, a gas is conveyed from the entrance hole to the discharge port to cause the gas to enter the cuff. On the other hand, a gas is conveyed from the discharge port to the entrance hole to deflate the cuff.

This bidirectional gas conveyance generates a pressure loss due to the filter. In particular, when a gas is conveyed from the discharge port to the entrance hole, the function as a filter (filtering function) is not indispensable and generates an unnecessary pressure loss.

Accordingly, a possible benefit of the present disclosure is to reduce the pressure loss when the filtering function of a filter is unnecessary.

A pump device includes a pump body, a filter member, and at least one holding member. The pump body includes a first wall and a second wall, the first wall having a suction hole, the second wall having a discharge hole. The filter member is located and shaped, on an outside of the pump body closer to the first wall, so as to overlap the suction hole when viewed in a direction orthogonal to the first wall. At least one holding member holds the filter member to the pump body so as to be able to change a distance between the first wall and at least a part, overlapping the suction hole, of the filter member. The at least one holding member is shaped such that a space formed between the first wall and the part, overlapping the suction hole, of the filter member communicates with an outer edge of the filter member or an outside of the at least one holding member in a state in which the part, overlapping the suction hole, of the filter member is apart from the first wall.

In this configuration, when a gas (fluid) is suctioned through the suction hole, the filter member overlaps and covers the suction hole. Thus, the gas is suctioned into the suction hole through the filter member. When a gas (fluid) is discharged through the suction hole, the filter member is apart from the suction hole. Thus, the gas (fluid) discharged through the suction hole is discharged to the outside through the filter member and is discharged to the outside from the outer edge of the filter member through the space between the first wall and the filter member. In this manner, when a gas (fluid) is discharged through the suction hole, the number of flow paths along which the gas is discharged is increased, thus reducing the pressure loss.

The present disclosure is capable of reducing the pressure loss when the filtering function of the filter is unnecessary.

DETAILED DESCRIPTION OF THE DISCLOSURE

Embodiment 1

Figure 1:
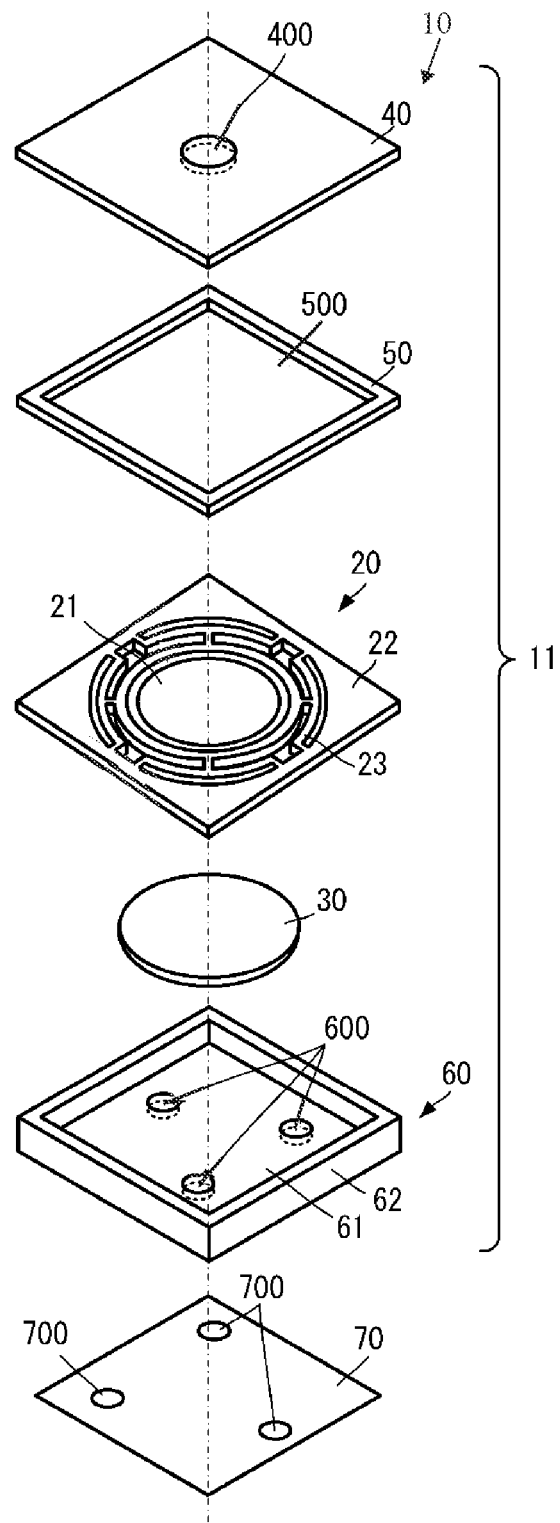
FIG. 1 is an exploded perspective view of a pump device according to Embodiment 1.
Figure 2:
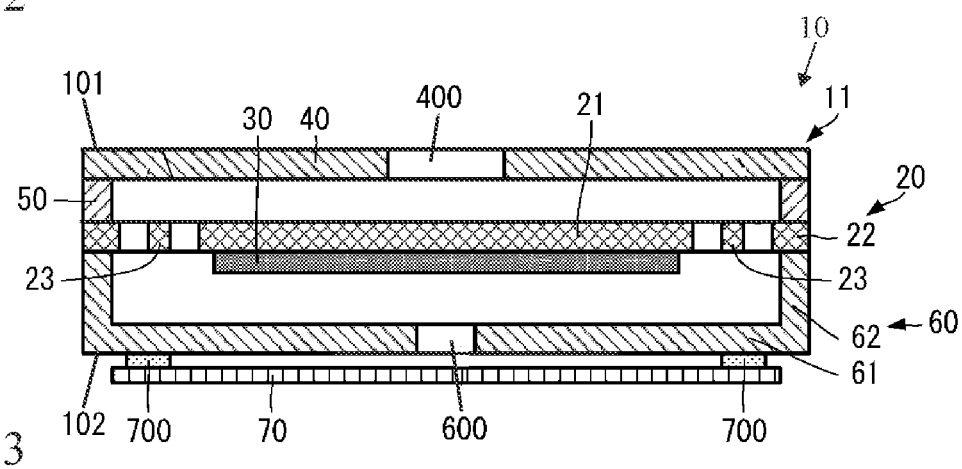
FIG. 2 is a schematic side sectional view illustrating the configuration of the pump device according to Embodiment 1.

A pump device according to Embodiment 1 of the present disclosure will be described with reference to the drawings. FIG. 1 is an exploded perspective view of the pump device according to Embodiment 1. FIG. 2 is a schematic side sectional view illustrating the configuration of the pump device according to Embodiment 1. In embodiments including the present embodiment, the figures illustrate the shapes of the components exaggerated partially or entirely to make the configurations of the actuators and the fluid control devices easy to understand.

As illustrated in FIGS. 1 and 2, a pump device 10 includes a pump body 11, a filter member 70, and a plurality of adhesive members 700.

The pump body 11 includes a flat plate member 20, a piezoelectric element 30, a flat plate member 40, a side wall member 50, and a cover member 60.

The flat plate member 20 is made of, for example, a metal plate and includes a main flat plate 21, a frame 22, and a plurality of connection members 23. The main flat plate 21, the frame 22, and the connection members 23 are integrally formed by using one flat plate, for example.

The main flat plate 21 has a circular shape in plan view. The frame 22 is disposed so as to surround the main flat plate 21. The connection members 23 each have a beam shape and are disposed between the main flat plate 21 and the frame 22. The connection members 23 support the main flat plate 21 so as to be able to vibrate the main flat plate 21 relative to the frame 22.

The piezoelectric element 30 has a circular shape in plan view. The piezoelectric element 30 includes a piezoelectric body and a driving conductor. The piezoelectric element 30 is disposed on one main surface of the main flat plate 21. In this case, the center of the piezoelectric element 30 and the center of the main flat plate 21 coincide with each other. The meaning of the term "coincide" includes a range in which the respective positions of the centers are shifted from each other within the manufacturing tolerance.

The piezoelectric element 30 is distorted by applying a driving voltage thereto. The main flat plate 21 is vibrated by a stress generated by distortion of the piezoelectric element 30.

The flat plate member 40 is made of, for example, a metal plate. The flat plate member 40 is disposed closer to the other main surface of the flat plate member 20. The flat plate member 40 and the flat plate member 20 are disposed such that a main surface of the flat plate member 40 and the main surface of the flat plate member 20 face each other. The flat plate member 40 is disposed so as to be apart from the other main surface of the flat plate member 20. The flat plate member 40 has a through hole 400 passing through the flat plate member 40 in the thickness direction.

The side wall member 50 has a hollow 500 and has a loop shape. The side wall member 50 is disposed between the flat plate member 20 and the flat plate member 40. The side wall member 50 is connected to the flat plate member 40 and the frame 22 of the flat plate member 20.

The cover member 60 includes a first portion 61 and a second portion 62. The cover member 60 is made of, for example, a metal. The first portion 61 is a flat plate. The second portion 62 is a frame provided upright, along the outer edge of the first portion 61, in a direction orthogonal to a main surface of the first portion 61. The first portion 61 has a plurality of through holes 600.

The cover member 60 is disposed such that the first portion 61 faces the flat plate member 20 and the side where the second portion 62 is provided upright is closer to the flat plate member 20. A tip end portion of the second portion 62 (an end portion located on the opposite side thereof from the side connected to the first portion 61) is connected to the frame 22 of the flat plate member 20.

In this configuration, when the main flat plate 21 vibrates as described above, a gas is suctioned into the pump body 11 through the through holes 600 and is discharged to the outside through the through hole 400. Thus, the pump body 11 functions as a pump configured to convey a gas. Accordingly, the through holes 600 each correspond to a "suction hole" of the present disclosure, and the through hole 400 corresponds to a "discharge hole" of the present disclosure. In addition, the first portion 61 of the cover member 60 corresponds to a "first wall" of the present disclosure, and the flat plate member 40 corresponds to a "second wall" of the present disclosure.

The filter member 70 is a flexible plate. That is, the shape of the filter member 70 is changed by, for example, the passage of a gas therethrough. The filter member 70 allows a gas to be conveyed by the pump device 10 to pass therethrough and shuts out other unnecessary substances (for example, dust whose particle diameter is larger than that of a gas). For example, the filter member 70 is a flat plate having a plurality of holes whose diameter is smaller than the opening diameter of the through holes 600. In addition, the filter member 70 may be, for example, a waterproof filter or a HEPA filter.

The shape of the filter member 70 in plan view (shape in a state in which an external pressure generated by, for example, passage of a gas therethrough is not applied thereto) is substantially the same as the shape of the pump body 11 in plan view (shape of a flat surface of the first portion 61 of the cover member 60 in plan view).

The filter member 70 is disposed so as to face an outer main surface 102 of the first portion 61 of the cover member 60.

The adhesive members 700 are disposed at respective positions different from those of the through holes 600 (positions that do not overlap the through holes 600) in plan view of the first portion 61. One end of each of the adhesive members 700 in the height direction adheres to the outer main surface 102 of the first portion 61, and the other end of each of the adhesive members 700 in the height direction adheres to the filter member 70. That is, the adhesive members 700, which are a plurality of parts that do not overlap the through holes 600 in plan view of the filter member 70, adhere and are fixed to the first portion 61. In this case, the height of the adhesive members 700 and the respective positions where the adhesive members 700 are disposed are set such that the filter member 70 covers the through holes 600 when the filter member 70 is deformed by the suction of a gas into the pump body 11 through the through holes 600. In this case, the flow rate of a gas to be suctioned and the degree of flexibility of the filter member 70 (for example, the elastic modulus) are taken into consideration. The adhesive members 700 each correspond to an "individual holding member" of the present disclosure.

(Suction)

Figure 3:
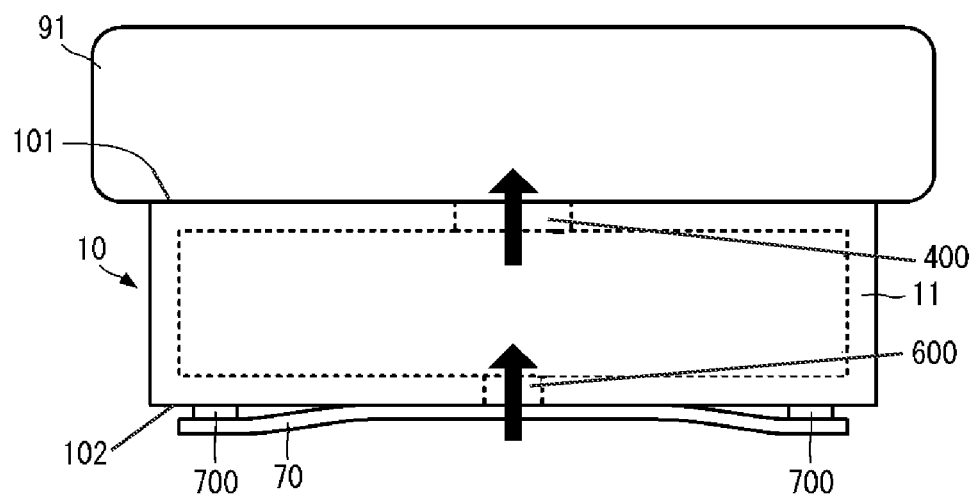
FIG. 3 is a schematic view illustrating the state of a filter member and other components when a gas is suctioned.

FIG. 3 is a schematic view illustrating the state of the filter member and other components when a gas is suctioned. FIG. 3 does not illustrate the specific structure of the interior of the pump body 11 (see FIG. 2). In FIG. 3, the thick arrows represent a gas flow.

Figure 4A:
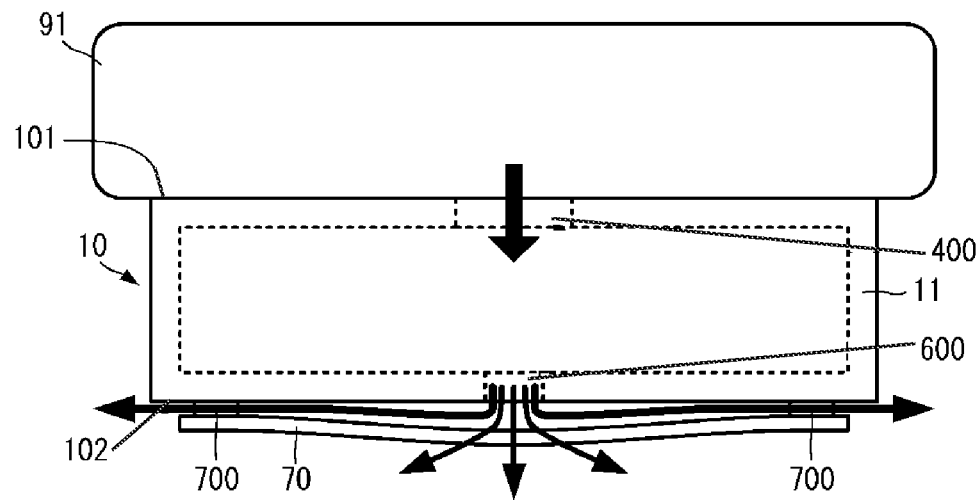
FIG. 4A is a schematic side view illustrating the state of the filter member and other components when a gas is discharged.
Figure 4B:
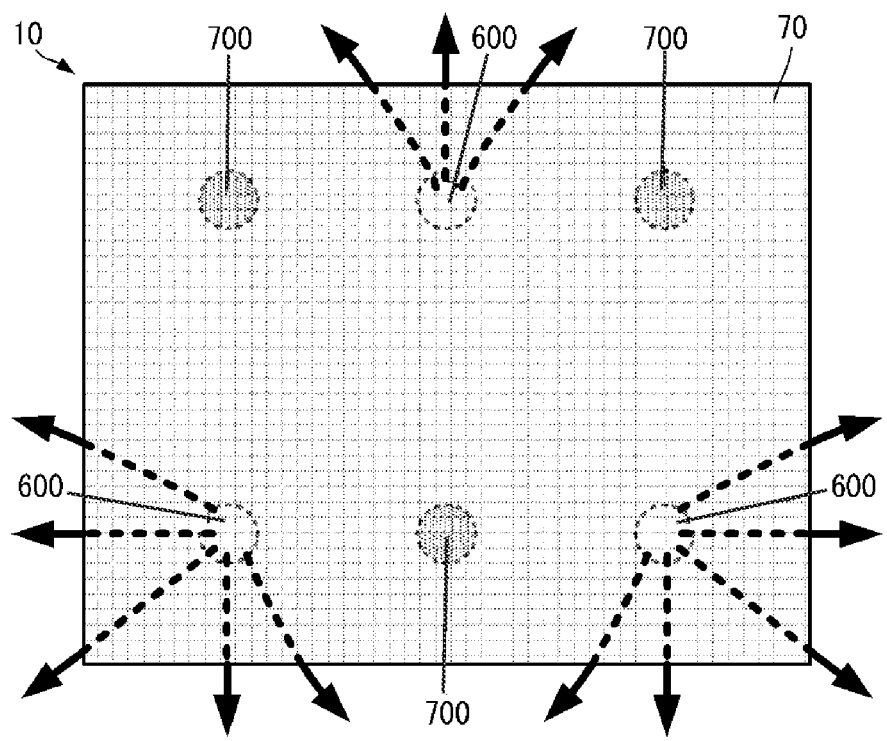
FIG. 4B is a plan view of a plane closer to the filter member.

As illustrated in FIG. 3 and FIGS. 4A and 4B, which is described later, as an example of the mode of using the pump device 10, a cuff 91 is attached to an outer main surface 101 of the pump body 11.

In this case, as illustrated in FIG. 3, a gas is suctioned into the pump body 11 through the through holes 600 and is discharged to the cuff 91 through the through hole 400. The gas flows into the through holes 600 from the side where the filter member 70 is located. In this case, the gas flows into the through holes 600 through the filter member 70.

During the passage of the gas, the filter member 70 is subjected to a stress toward the pump body 11. The filter member 70 is flexible and thus bent by this stress. Then, the filter member 70 comes into contact with the pump body 11 (the first portion 61 of the cover member 60) in a predetermined region including the through holes 600.

Thus, the through holes 600 are covered by the filter member 70. Accordingly, only the gas filtered by the filter member 70 is suctioned into the pump body 11. As a result, only the filtered gas is discharged also to the cuff 91.
(Discharge)

The gas is discharged by stopping driving the pump body 11, for example. In this case, the interior of the cuff 91 is higher in pressure than the pump body 11 and the outside, and the gas is thus discharged to the pump body 11 from the cuff 91. When the direction in which the gas is conveyed in the pump body 11 can be reversed, the pump body 11 may be driven such that the gas is conveyed from the through hole 400 to the through holes 600.

FIG. 4A is a schematic side view illustrating the state of the filter member and other components when a gas is discharged. FIG. 4B is a plan view of a plane closer to the filter member. FIG. 4A does not illustrate the specific structure of the interior of the pump body 11 (see FIG. 2). In FIGS. 4A and 4B, the thick arrows represent gas flows.

As illustrated in FIGS. 4A and 4B, when a gas is discharged to the interior of the pump body 11 from the cuff 91 through the through hole 400 and is discharged to the outside from the interior of the pump body 11 through the through holes 600, the gas is discharged to the filter member 70 outside the pump body 11 through the through holes 600. As illustrated in FIG. 4B, the filter member 70 is apart from the outer main surface 102 of the first portion 61 of the pump body 11 by being subjected to a stress generated by the discharged gas.

The filter member 70 is gas permeable. Thus, as illustrated in FIG. 4A, part of the gas discharged through the through holes 600 is discharged to the outside through the filter member 70.

In addition, as described above, the filter member 70 partially adheres to the first portion 61 with the adhesive members 700. Accordingly, in a state in which the filter member 70 is apart from the through holes 600, the space where the filter member 70 and the through holes 600 overlap each other in plan view communicates with the opening, at the outer edge of the filter member 70, between the filter member 70 and the first portion 61.

Thus, as illustrated in FIGS. 4A and 4B, part of the gas discharged through the through holes 600 is discharged to the outside from the opening at the outer edge of the filter member 70 through the space formed between the filter member 70 and the outer main surface 102 of the first portion 61.

In this manner, when a gas is discharged, the flow paths along which the gas is discharged through the filter member 70 and the flow paths along which the gas is discharged from the opening at the outer edge of the filter member 70 through the space between the filter member 70 and the first portion 61 are formed. This configuration reduces the pressure loss when a gas is discharged.

As described above, the use of the configuration of the present embodiment enables, when a gas is suctioned, the filtering function of the filter member 70 to be achieved more reliably and enables, when a gas is discharged, a reduction in pressure loss and rapid discharge thereof.

Then, for example, the use of this configuration enables dust and other substances to be inhibited from entering the cuff 91 and enables rapid discharge of a gas from the cuff 91. In this case, for example, a rapid exhaust valve that is an additional component does not have to be provided, thus enabling a size reduction and a height reduction of the pump device 10.

In addition, in this configuration, when a gas is discharged, the gas discharged through the through holes 600 flows along the surface of the first portion 61 of the cover member 60. As a result, the gas easily absorbs the heat of the pump body 11, thus improving the heat dissipation from the pump device 10. Furthermore, when the filter member 70 is made of a material having a high thermal conductivity such as a metal, the filter member 70 is capable of dissipating the heat. Thus, the pump device 10 is further improved in the heat dissipation.

Embodiment 2

Figure 5:
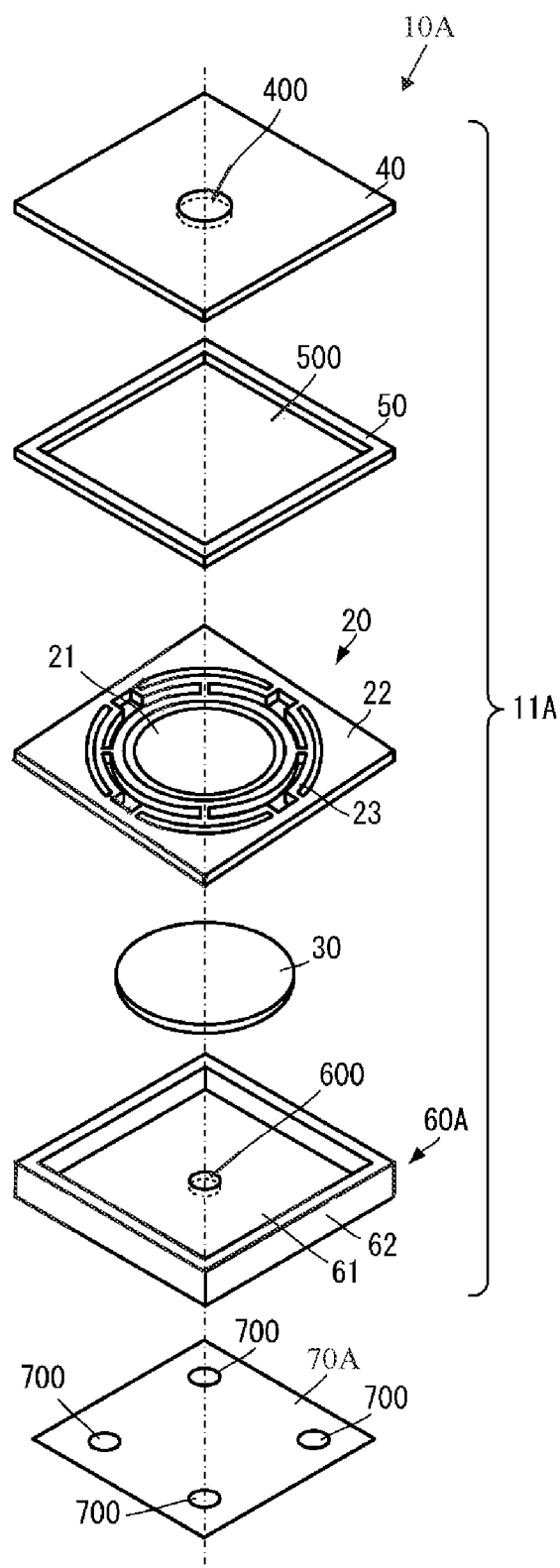
FIG. 5 is an exploded perspective view of a pump device according to Embodiment 2.

A pump device according to Embodiment 2 of the present disclosure will be described with reference to the drawings. FIG. 5 is an exploded perspective view of the pump device according to Embodiment 2.

As illustrated in FIG. 5, a pump device 10A according to Embodiment 2 differs from the pump device 10 according to Embodiment 1 in the provision of a pump body 11A and the disposition of the adhesive members 700. The other configurations of the pump device 10A are similar to those of the pump device 10, and the descriptions of the similar parts are omitted.

The pump device 10A includes the pump body 11A. The pump body 11A includes a cover member 60A. The cover member 60A has the through hole 600 located substantially at the center of the first portion 61.

The filter member 70A adheres, in the vicinities of the corners along the outer edge thereof, to the first portion 61 of the cover member 60A with the adhesive members 700. In other words, the adhesive members 700 are disposed so as to surround and not to overlap the through hole 600 in plan view.
(Suction)

The suction operation is substantially the same as that in Embodiment 1. However, surrounding the through hole 600 enables a reduction in the difference in deformation between positions in the circumferential direction of the part, overlapping the through hole 600, of a filter member 70A. Thus, when a gas is suctioned, the filter member 70A is capable of more reliably covering the through hole 600.
(Discharge)

Figure 6:
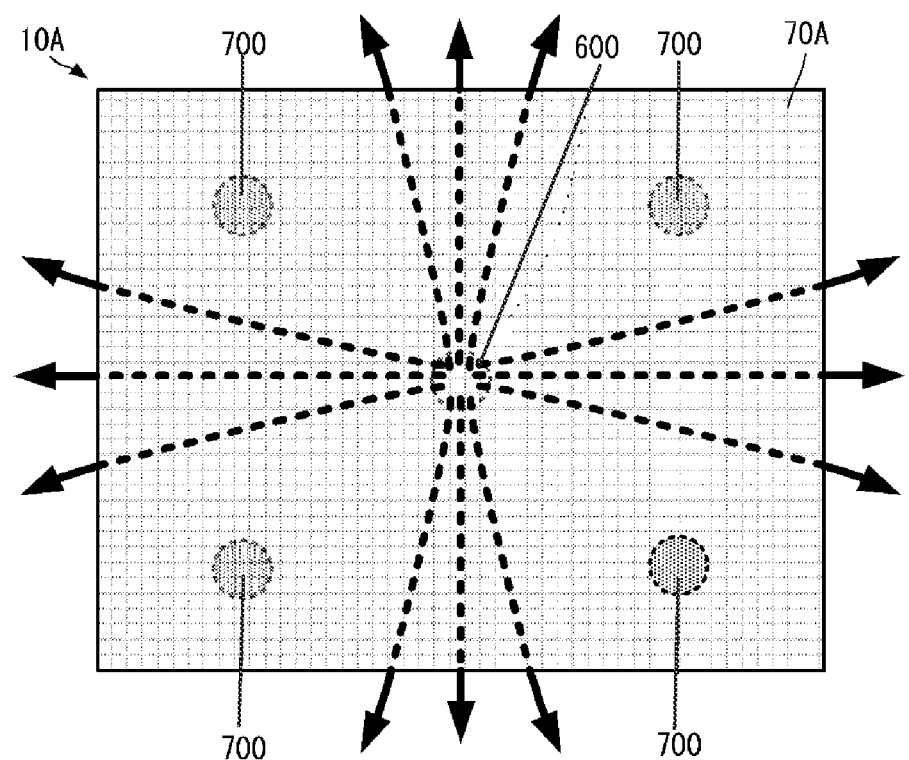
FIG. 6 is a plan view of a plane closer to a filter member when a gas is discharged.

FIG. 6 is a plan view of a plane closer to the filter member when a gas is discharged. The discharge operation is also substantially the same as that in Embodiment 1. However, as with the suction operation, surrounding the through hole 600 enables a reduction in the difference in deformation between positions in the circumferential direction of the part, overlapping the through hole 600, of the filter member 70A.

Thus, the gas that is discharged through the through hole 600 and that flows between the filter member 70A and the first portion 61 of the cover member 60A flows substantially uniformly in all directions of the filter member 70A other than directions toward the adhesive members 700 and is discharged to the outside from the opening at the outer edge. Accordingly, for example, it is possible to substantially uniformly dissipate the heat from substantially the entire surface of the first portion 61 of the cover member 60A.

Embodiment 3

Figure 7:
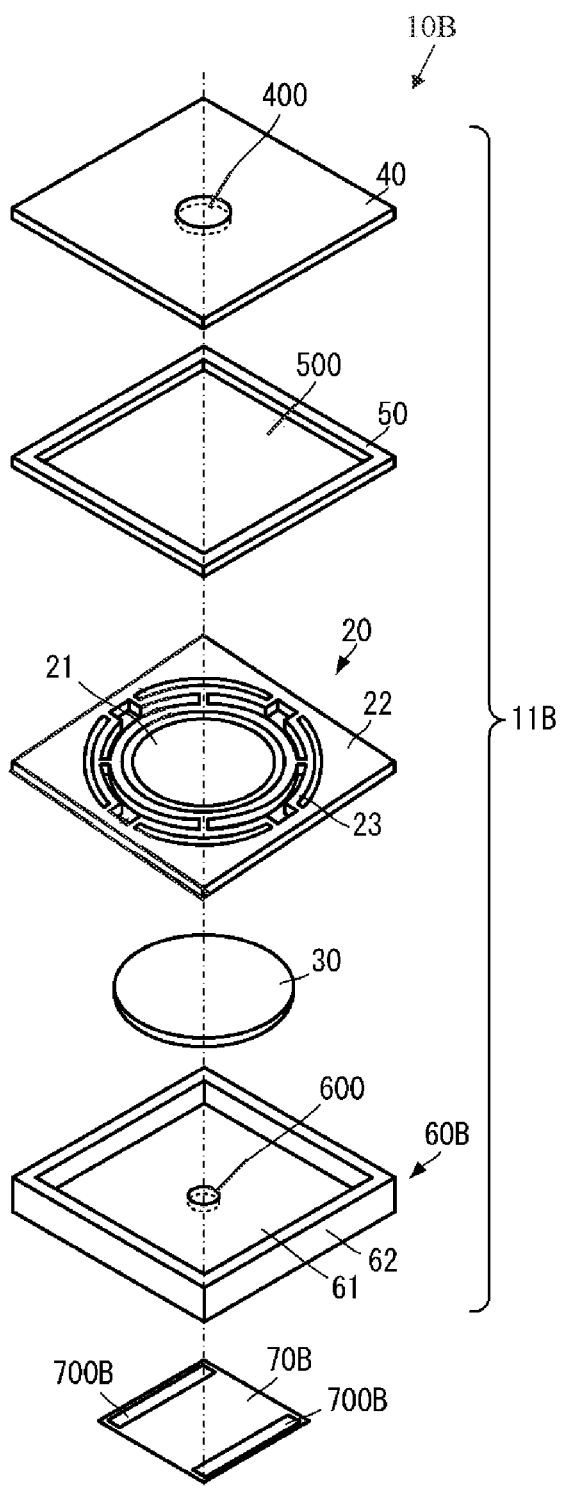
FIG. 7 is an exploded perspective view of a pump device according to Embodiment 3.

A pump device according to Embodiment 3 of the present disclosure will be described with reference to the drawings. FIG. 7 is an exploded perspective view of the pump device according to Embodiment 3.

As illustrated in FIG. 7, a pump device 10B according to Embodiment 3 differs from the pump device 10A according to Embodiment 2 in a filter member 70B and adhesive members 700B. The other configurations of the pump device 10B are similar to those of the pump device 10A, and the descriptions of the similar parts are omitted. A pump body 11B and a cover member 60B of the pump device 10B are respectively the same as the pump body 11A and the cover member 60A of the pump device 10A.

The external shape of the filter member 70B in plan view is smaller than the external shape of the first portion 61 of the cover member 60B in plan view.

The filter member 70B is disposed so as to overlap the through hole 600 in plan view. More specifically, the filter member 70B is disposed such that the center of the filter member 70B in plan view overlaps the through hole 600.

The adhesive members 700B each have a belt shape. The adhesive members 700B are disposed along two respective sides of the filter member 70B facing each other. In this case, the adhesive members 700B are apart from each other.

The adhesive members 700B adhere to the first portion 61 of the cover member 60B so as not to overlap the through hole 600 with the through hole 600 interposed therebetween in plan view.

(Suction)

Figure 8:
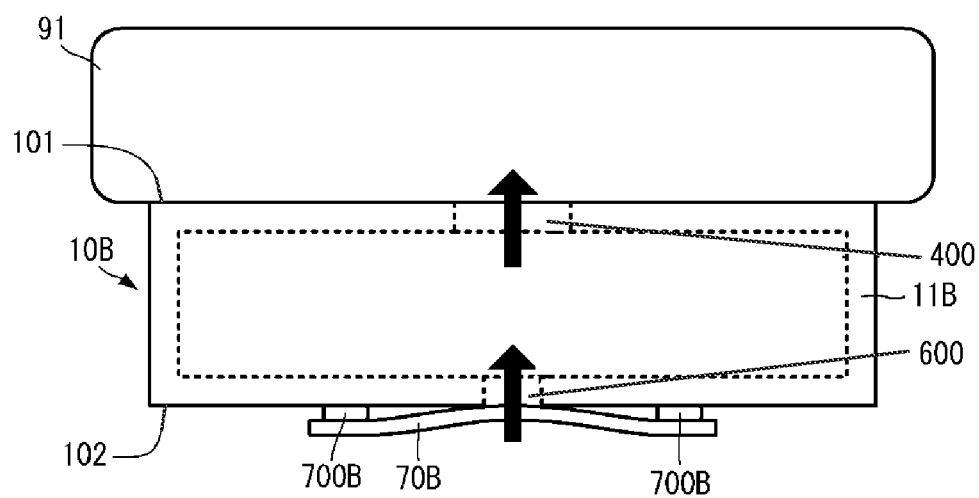
FIG. 8 is a schematic view illustrating the state of a filter member and other components when a gas is suctioned.

FIG. 8 is a schematic view illustrating the state of the filter member and other components when a gas is suctioned. FIG. 8 does not illustrate the specific structure of the interior of the pump body 11B (see FIG. 7). In FIG. 8, the thick arrows represent a gas flow.

As illustrated in FIG. 8, the suction operation is substantially the same as that in Embodiment 1. Here, in the pump device 10B, the adhesive members 700B are disposed with the through hole 600 interposed therebetween in one direction along the outer main surface 102 of the pump body 11B (outer main surface 102 of the first portion 61 of the cover member 60B). Thus, it is possible to inhibit a gas from being suctioned from both sides in the one direction without passing through the filter member 70B before the filter member 70B comes into contact with the first portion 61 at the start of the suction operation. That is, the pump device 10B is capable of inhibiting dust from being suctioned in the early stage of the suction operation (filtering transition).

(Discharge)

Figure 9A:
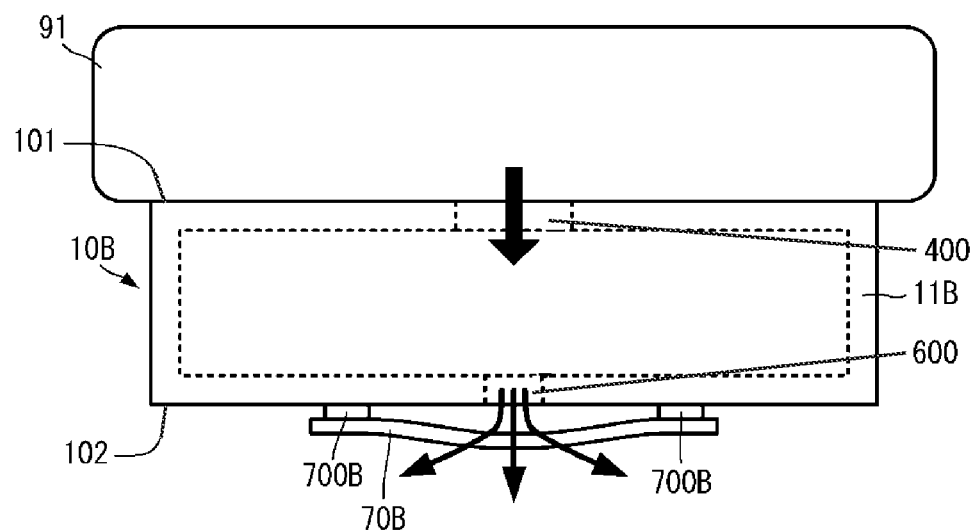
FIG. 9A is a schematic side view illustrating the state of the filter member and other components when a gas is discharged.
Figure 9B:
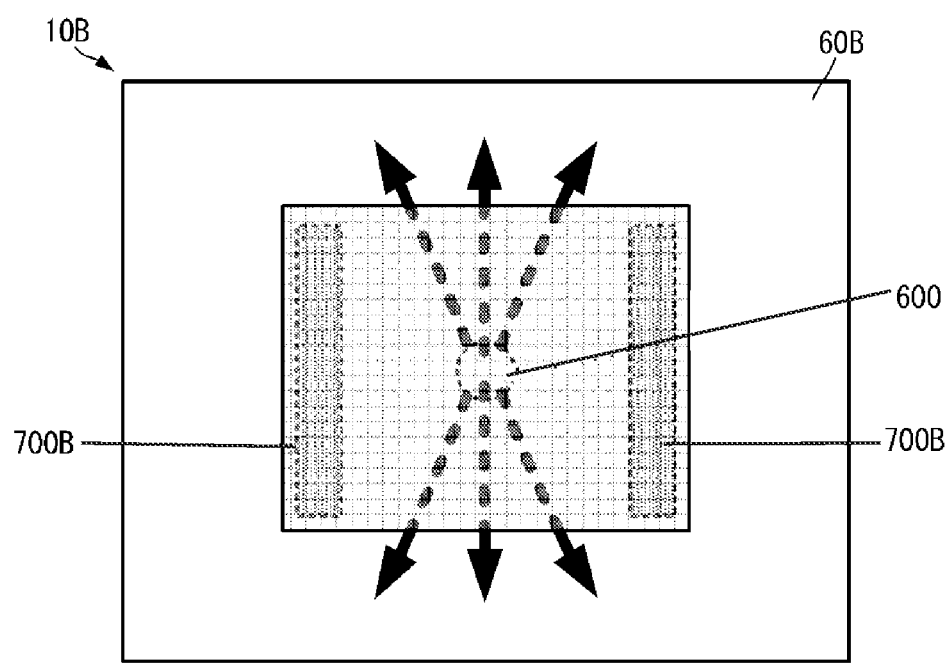
FIG. 9B is a plan view of a plane closer to the filter member.

FIG. 9A is a schematic side view illustrating the state of the filter member and other components when a gas is discharged. FIG. 9B is a plan view of a plane closer to the filter member. FIG. 9A does not illustrate the specific structure of the interior of the pump body 11B (see FIG. 7). In FIGS. 9A and 9B, the thick arrows represent a gas flow.

As illustrated in FIGS. 9A and 9B, the discharge operation is also substantially the same as that in Embodiment 1. However, the external shape of the filter member 70B is smaller than the external shape of the first portion 61 of the cover member 60B, thus reducing the distance from the through hole 600 to the opening at the outer edge of the filter member 70B.

This configuration further reduces the pressure loss in the flow path from the through hole 600 to the opening at the outer edge of the filter member 70B. Accordingly, the pump device 10B is capable of further reducing the pressure loss when a gas is discharged.

Embodiment 4

Figure 10A:
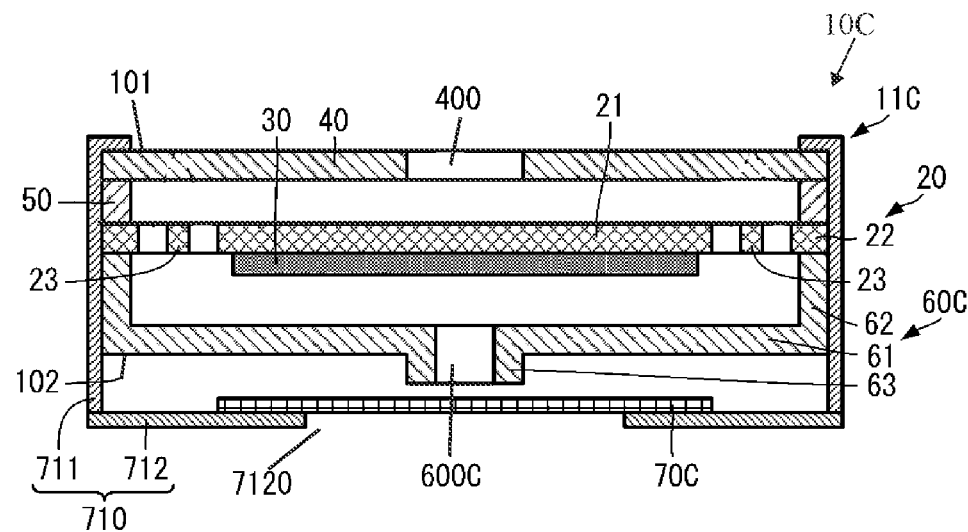
FIG. 10A is a schematic side sectional view illustrating the configuration of a pump device according to Embodiment 4.
Figure 10B:
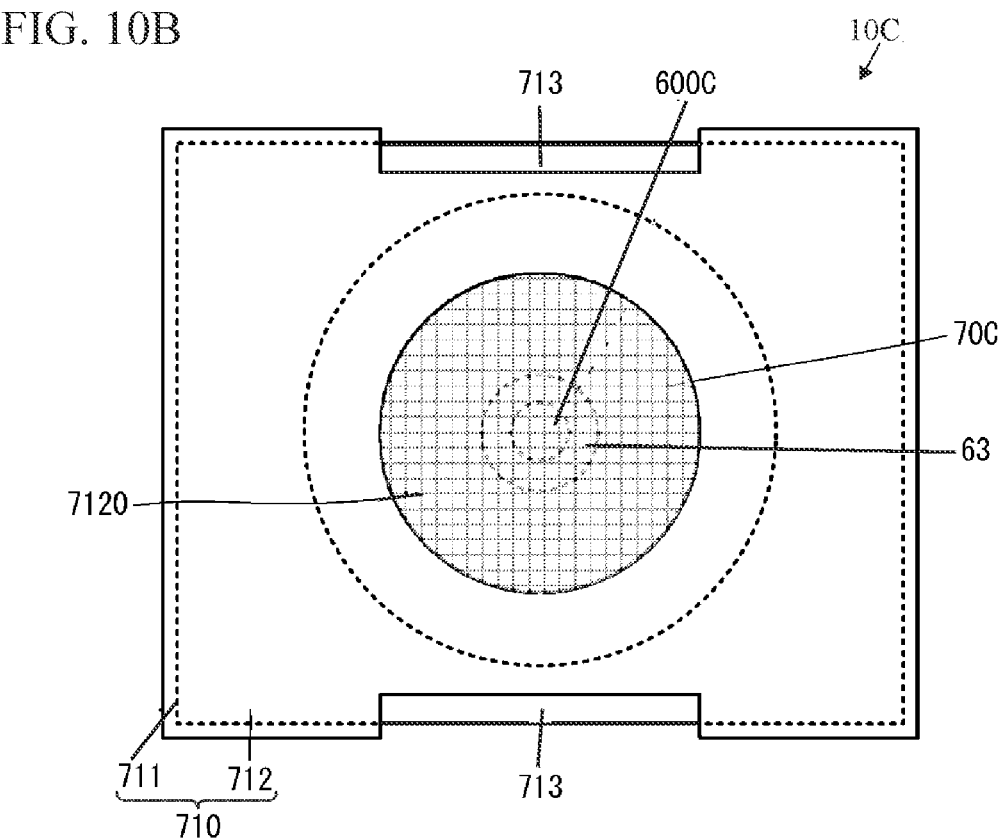
FIG. 10B is a plan view of a plane closer to a filter member.

A pump device according to Embodiment 4 of the present disclosure will be described with reference to the drawings. FIG. 10A is a schematic side sectional view illustrating the configuration of the pump device according to Embodiment 4. FIG. 10B is a plan view of a plane closer to a filter member.

As illustrated in FIGS. 10A and 10B, a pump device 10C according to Embodiment 4 differs from the pump device 10 according to Embodiment 1 in the configuration of a pump body 11C and the provision of a holding member 710, which is made of a rigid body different from an adhesive member and which physically holds the pump body 11C. The other configurations of the pump device 10C are similar to those of the pump device 10, and the descriptions of the similar parts are omitted.

The pump device 10C includes the pump body 11C, a filter member 70C, and the holding member 710. The pump body 11C includes a cover member 60C including a nozzle 63. A part projecting from the outer main surface 102 of the first portion 61 forms the nozzle 63. A through hole 600C passes through the nozzle 63 and the first portion 61.

The holding member 710 includes a frame 711 and a flat plate 712.

The frame 711 is fixed to side surfaces of the pump body 11C. The frame 711 does not overlap the through hole 400 of the flat plate member 40 in plan view. The frame 711 does not overlap the first portion 61 and the nozzle 63 of the cover member 60C in plan view.

The flat plate 712 has an opening 7120. The external shape of the opening 7120 is larger than the external shape of the nozzle 63 and smaller than the external shape of the filter member 70C. The flat plate 712 is disposed outside the pump body 11C closer to the first portion 61 of the cover member 60C. The flat plate 712 is connected to the frame 711 at the outer edge thereof. In this case, as illustrated in FIG. 10B, the entire outer edge of the flat plate 712 is not connected to the frame 711, and the flat plate 712 has openings 713, which are parts that are not connected to the frame 711.

The external shape of the filter member 70C is smaller than the external shape of the first portion 61 in plan view. The filter member 70C is disposed between the flat plate 712 and the first portion 61. In this case, the filter member 70C is disposed at a position that does not come into contact with the nozzle 63 in a state in which a gas is not suctioned and discharged.

(Suction)

Figure 11:
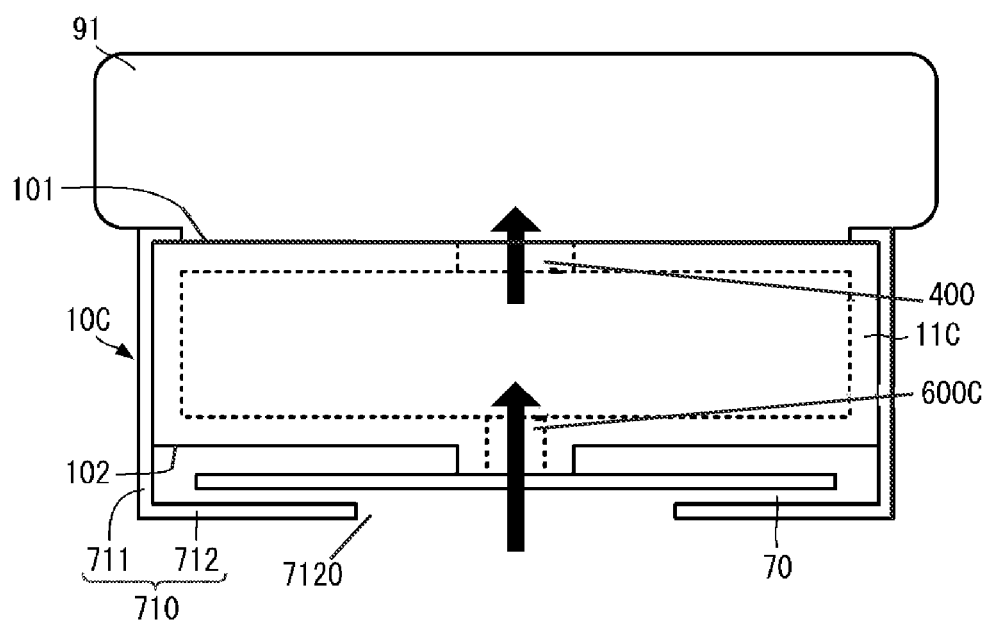
FIG. 11 is a schematic view illustrating the state of the filter member and other components when a gas is suctioned.

FIG. 11 is a schematic view illustrating the state of the filter member and other components when a gas is suctioned. FIG. 11 does not illustrate the specific structure of the interior of the pump body 11C (see FIG. 10A). In FIG. 11, the thick arrows represent a gas flow.

As illustrated in FIG. 11, when a gas is suctioned, the gas is suctioned into the through hole 600C through the opening 7120 and the filter member 70C. In this case, the filter member 70C is moved from a position that comes into contact with the flat plate 712 to a position that comes into contact with the nozzle 63 by being subjected to a stress generated by the gas. Thereafter, the gas flow keeps the filter member 70C in a state of being in contact with the nozzle 63.

Thus, when a gas is suctioned, the through hole 600C is covered by the filter member 70C.

(Discharge)

Figure 12A:
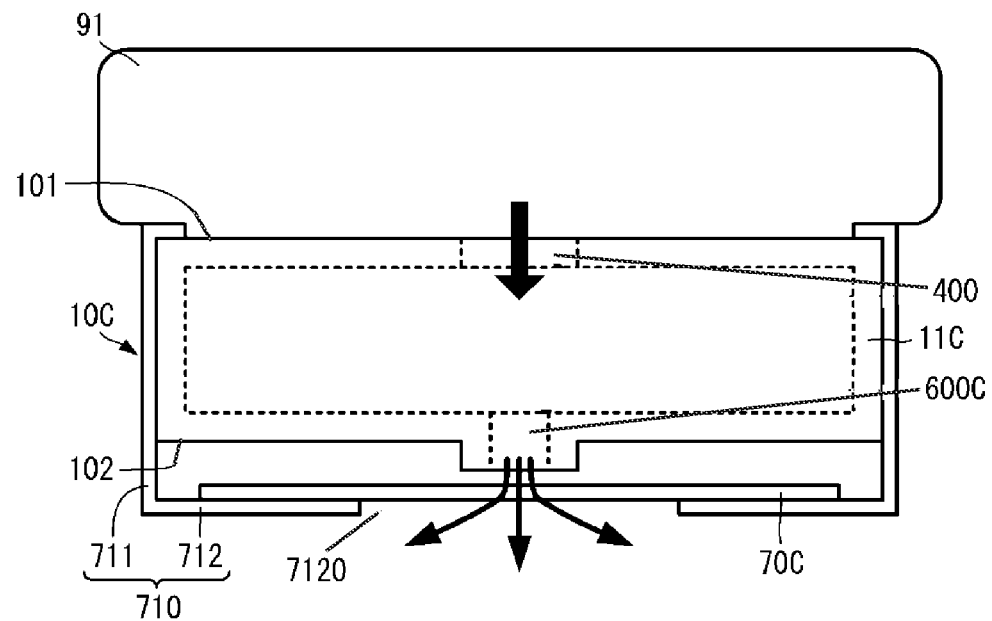
FIG. 12A is a schematic side view illustrating the state of the filter member and other components when a gas is discharged.
Figure 12B:
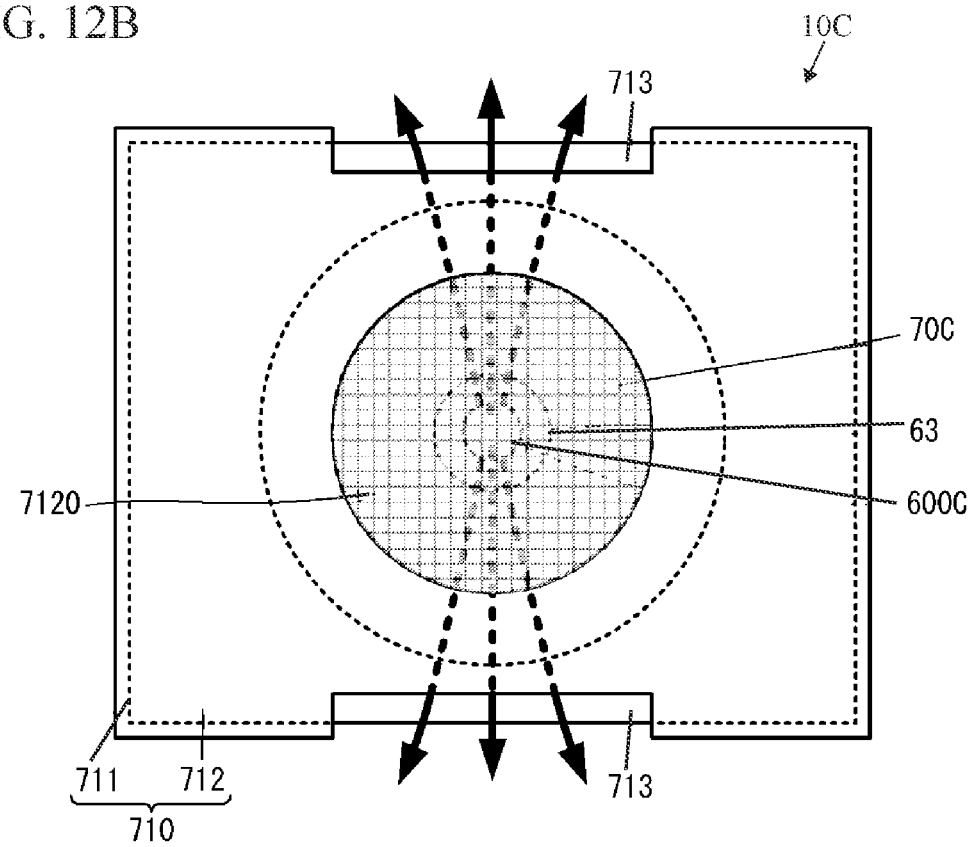
FIG. 12B is a plan view of a plane closer to the filter member.

FIG. 12A is a schematic side view illustrating the state of the filter member and other components when a gas is discharged. FIG. 12B is a plan view of a plane closer to the filter member. FIG. 12A does not illustrate the specific structure of the interior of the pump body 11C (see FIG. 10A). In FIGS. 12A and 12B, the thick arrows represent a gas flow.

As illustrated in FIGS. 12A and 12B, when a gas is discharged, the gas is discharged to the filter member 70C outside the pump body 11C through the through hole 600C. The filter member 70C is apart from the nozzle 63 by being subjected to a stress generated by the discharged gas. Thus, the filter member 70C comes into contact with and is held by the flat plate 712.

The filter member 70C is gas permeable. Thus, as illustrated in FIG. 12A, part of the gas discharged through the through hole 600C passes through the filter member 70C and is discharged to the outside through the opening 7120.

In addition, as described above, the holding member 710 including the frame 711 and the flat plate 712 has the openings 713, which are open sideward, for example.

Thus, as illustrated in FIG. 12B, part of the gas discharged through the through hole 600C is discharged to the outside from the openings 713 through the space formed between the filter member 70C and both the nozzle 63 and the outer main surface 102 of the first portion 61.

In this manner, when a gas is discharged, the flow path along which the gas passes through the filter member 70C and is discharged through the opening 7120 and the flow paths along which the gas is discharged from the openings 713 of the holding member 710 are formed. This configuration reduces the pressure loss when a gas is discharged.

Accordingly, as with the pump device 10, the pump device 10C enables, when a gas is suctioned, the filtering function of the filter member 70C to be achieved more reliably and enables, when a gas is discharged, a reduction in pressure loss and rapid discharge thereof.

In addition, in the configuration of the pump device 10C, the filter member 70C does not have to adhere to the pump body 11C. Thus, the heat generated in the pump body 11C is less likely to be transmitted to the filter member 70C. As a result, the thermal deformation of the filter member 70C and the positional misalignment of the holes of the filter member 70C due to such thermal deformation are less likely to occur.

Modes in which a gas is conveyed have been described above. However, the above configurations are applicable not only to such a gas but also to other fluids.

In addition, the shape of the piezoelectric element in plan view is not limited to a circular shape and may be, for example, a polygonal shape.

In addition, the configurations of the above embodiments can be combined as appropriate. It is possible to achieve functions and effects according to respective combinations.

10, 10A, 10B, 10C: pump device
11, 11A, 11B, 11C: pump body
20: flat plate member
21: main flat plate
22: frame
23: connection member
30: piezoelectric element
40: flat plate member
50: side wall member
60, 60A, 60B, 60C: cover member
61: first portion
62: second portion
63: nozzle
70, 70A, 70B, 70C: filter member
91: cuff
101, 102: outer main surface
400: through hole
500: hollow
600, 600C: through hole
700, 700B: adhesive member
710: holding member
711: frame
712: flat plate
713, 7120: opening

The invention claimed is:

1. A pump device comprising:
a pump body including a first wall and a second wall, the first wall having a suction hole, the second wall having a discharge hole;
a filter member located and shaped, on an outside of the pump body closer to the first wall, so as to overlap the suction hole when viewed in a direction orthogonal to the first wall; and
at least one holding member holding the filter member at a distance from the pump body so that a distance between the first wall and at least a part of the filter member overlapping the suction hole is changeable,
wherein the at least one holding member is shaped such that a space provided between the first wall and the part of the filter member overlapping the suction hole communicates with an outer edge of the filter member or an outside of the at least one holding member, without passage through the filter member in a state in which the part of the filter member overlapping the suction hole is apart from the first wall, and
wherein the pump device is a piezoelectric pump.

2. The pump device according to claim 1, wherein
the at least one holding member includes a plurality of individual holding members, and
the plurality of individual holding members are apart from each other and are disposed at respective positions surrounding the suction hole when viewed in the direction orthogonal to the first wall.

3. The pump device according to claim 1, wherein the filter member is smaller than the first wall when viewed in the direction orthogonal to the first wall.

4. The pump device according to claim 1, wherein the filter member has a plate shape, has a main surface parallel to the first wall, and is flexible so that a shape of the main surface is changeable.

5. The pump device according to claim 4, wherein the at least one holding member is an adhesive member with which the filter member adheres to the first wall.

6. The pump device according to claim 1, wherein the at least one holding member holds the filter member so that a whole of the filter member is movable in the direction orthogonal to the first wall.

7. The pump device according to claim 2, wherein the filter member is smaller than the first wall when viewed in the direction orthogonal to the first wall.

8. The pump device according to claim 2, wherein the filter member has a plate shape, has a main surface parallel to the first wall, and is flexible so that a shape of the main surface is changeable.

9. The pump device according to claim 3, wherein the filter member has a plate shape, has a main surface parallel to the first wall, and is flexible so that a shape of the main surface is changeable.

10. The pump device according to claim 2, wherein the plurality of individual holding members hold the filter member so that a whole of the filter member is movable in the direction orthogonal to the first wall.

11. The pump device according to claim 3, wherein the at least one holding member holds the filter member so that a whole of the filter member is movable in the direction orthogonal to the first wall.

12. The pump device according to claim 4, wherein the at least one holding member holds the filter member so that a whole of the filter member is movable in the direction orthogonal to the first wall.

* * * * *